US011016448B2

(12) United States Patent
Eshima et al.

(10) Patent No.: US 11,016,448 B2
(45) Date of Patent: May 25, 2021

(54) WATCH WITH BUILT-IN TAG AND METHOD OF DETERMINING AUTHENTICITY OF WATCH WITH BUILT-IN TAG

(71) Applicant: Murata Manufacturing Co., Ltd., Nagaokakyo (JP)

(72) Inventors: Kazuki Eshima, Nagaokakyo (JP); Makoto Yasutake, Nagaokakyo (JP); Teppei Miura, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 336 days.

(21) Appl. No.: 16/290,185

(22) Filed: Mar. 1, 2019

(65) Prior Publication Data
US 2019/0196414 A1    Jun. 27, 2019

Related U.S. Application Data

(63) Continuation of application No. PCT/JP2017/039410, filed on Oct. 31, 2017.

(30) Foreign Application Priority Data

Nov. 16, 2016  (JP) .............................. JP2016-223421
Jan. 26, 2017  (JP) .............................. JP2017-012398

(51) Int. Cl.
*G04G 21/04*    (2013.01)
*H01Q 7/00*    (2006.01)
(Continued)

(52) U.S. Cl.
CPC ............. *G04G 21/04* (2013.01); *G04G 17/04* (2013.01); *G04G 17/08* (2013.01);
(Continued)

(58) Field of Classification Search
CPC .... G04G 17/04; G04G 17/08; G06K 7/10366; G06K 19/07773; H01Q 1/22; H01Q 7/00
(Continued)

(56) References Cited

U.S. PATENT DOCUMENTS 6,525,646 B1 *  2/2003  Bartz .................... G04B 47/00
                                                340/5.41
6,724,690 B1    4/2004  Endo et al.
(Continued)

FOREIGN PATENT DOCUMENTS

JP    S5497172 U    7/1979
JP    S585996 Y2    2/1983
(Continued)

OTHER PUBLICATIONS

International Search Report issued for PCT/JP2017/039410, dated Jan. 30, 2018.
(Continued)

*Primary Examiner* — Michael G Lee
*Assistant Examiner* — David Tardif
(74) *Attorney, Agent, or Firm* — Arent Fox LLP (57) ABSTRACT

A watch with a built-in tag that includes a display displaying a time, a metal case having a through-hole in a side surface, a metal crown disposed to enable opening and closing of the through-hole, and a wireless communication device housed inside the case. The crown includes a head located outside the case and coming into contact with the case to close the through-hole, and a shank extending to the inside of the case through the through-hole with one end portion connected to the head and the other end portion located inside the case. When the head of the crown is pulled in a direction away from the case, the head of the crown becomes contactless
(Continued)

with the case to enable a reader device located outside the case to read information of the wireless communication device through the crown.

20 Claims, 9 Drawing Sheets (51) Int. Cl.
    *H01Q 1/27*    (2006.01)
    *G04G 17/08*   (2006.01)
    *G06K 7/10*    (2006.01)
    *H01Q 1/22*    (2006.01)
    *G06K 19/077*   (2006.01)
    *G06K 19/073*   (2006.01)
    *G04G 17/04*   (2006.01)
    *H01Q 1/40*    (2006.01)

(52) U.S. Cl.
    CPC ....... *G06K 7/10366* (2013.01); *G06K 19/073* (2013.01); *G06K 19/077* (2013.01); *G06K 19/07773* (2013.01); *H01Q 1/22* (2013.01); *H01Q 1/2225* (2013.01); *H01Q 1/273* (2013.01); *H01Q 1/405* (2013.01); *H01Q 7/00* (2013.01)

(58) Field of Classification Search
    USPC ............................................................ 368/1
    See application file for complete search history.

(56) References Cited

U.S. PATENT DOCUMENTS

| | | | | |
|---|---|---|---|---|
| 6,987,708 | B2* | 1/2006 | Megner | G04B 37/0033 |
| | | | | 340/539.11 |
| 10,594,021 | B2* | 3/2020 | Sakurasawa | H01Q 1/002 |
| 2017/0277990 | A1 | 9/2017 | Tokunaga et al. | |
| 2018/0190455 | A1* | 7/2018 | Vuille | G06K 19/07345 |
| 2019/0067803 | A1* | 2/2019 | Kang | G04G 21/04 |
| 2019/0103688 | A1* | 4/2019 | Pandya | H01R 13/114 |
| 2020/0073337 | A1* | 3/2020 | Wang | G06F 1/1656 |

FOREIGN PATENT DOCUMENTS

| | | |
|---|---|---|
| JP | S58162087 U | 10/1983 |
| JP | 2003035786 A | 2/2003 |
| JP | 2007017279 A | 1/2007 |
| JP | 2013002977 A | 1/2013 |
| WO | 2016132654 A1 | 8/2016 |

OTHER PUBLICATIONS

Written Opinion of the International Searching Authority issued for PCT/JP2017/039410, dated Jan. 30, 2018.

* cited by examiner

WATCH WITH BUILT-IN TAG AND METHOD OF DETERMINING AUTHENTICITY OF WATCH WITH BUILT-IN TAG

CROSS REFERENCE TO RELATED APPLICATIONS

The present application is a continuation of PCT/JP2017/039410 filed Oct. 31, 2017, which claims priority to Japanese Patent Application No. 2016-223421, filed Nov. 16, 2016, and Japanese Patent Application No. 2017-012398, filed Jan. 26, 2017, the entire contents of each of which are incorporated herein by reference.

TECHNICAL FIELD

The present disclosure relates to a watch with a built-in tag having a wireless communication device inside a metal case and a method of determining authenticity of a watch with a built-in tag.

BACKGROUND

Watches with an RFID tag (Radio Frequency Identification) incorporated as a wireless communication device for determination of authenticity of the watch is conventionally known. By reading information of the RFID tag with a reader device, the authenticity of the watch can be determined.

However, metal cases are typically used for watches such as luxury brand watches and pocket watches. Basically, a metal case does not radiate radio waves transmitted from an RFID tag to the outside. In this regard, Patent Document 1 (identified below) discloses a watch with a built-in tag provided with a slit on a back surface of a metal case such that radio waves transmitted from an RFID tag are radiated through the slit to the outside.

Patent Document 1: Japanese Laid-Open Patent Publication No. 2003-35786.

However, the watch with a built-in tag, as described in Patent Document 1, has the slit disposed on the back surface of the metal case and is therefore reduced in the strength of the case and subject to a restriction on appearance design. Additionally, since the information of the RFID tag becomes constantly readable from the outside through the slit, the watch has a risk of leakage of information (e.g., unique ID) of the RFID tag.

SUMMARY OF THE INVENTION

An object of the present disclosure is to solve the problems noted above and provide a watch with a built-in tag and a method of determining authenticity of a watch with a built-in tag that suppresses a reduction in strength of a case, restriction on appearance design, and leakage of information of a wireless communication device.

Accordingly, a watch is provided that includes a built-in tag according to an exemplary aspect of the present disclosure. Specifically, the exemplary watch includes a display part displaying a time; a metal case having a through-hole in a side surface; a metal crown disposed to enable opening and closing of the through-hole; and a wireless communication device housed inside the case. Moreover, the crown includes a head located outside the case and coming into contact with the case to close the through-hole, and a shank extending to the inside of the case through the through-hole with one end portion connected to the head and the other end portion located inside the case. According to the exemplary aspect, when the head of the crown is pulled in a direction away from the case, the head of the crown becomes contactless with the case to enable a reader device located outside the case to read information of the wireless communication device through the crown.

A method of determining authenticity of a watch with a built-in tag according to an exemplary aspect of the present disclosure is provided as a method of determining authenticity of a watch with a built-in tag. In this aspect, the watch with a built-in tag includes a display part displaying a time, a metal case having a through-hole in a side surface; a metal crown disposed to enable opening and closing of the through-hole, and a wireless communication device housed inside the case. Moreover, the method includes pulling, in a direction away from the case, a head of the crown that is located outside the case and that comes into contact with the case to close the through-hole; and reading information of the wireless communication device by the reader device while the head of the crown is made contactless with the case.

The present disclosure can provide the watch with a built-in tag and the method of determining authenticity of a watch with a built-in tag capable of suppressing a reduction in strength of a case, restriction on appearance design, and leakage of information of a wireless communication device.

DETAILED DESCRIPTION

A watch with a built-in tag according to an exemplary aspect of the present disclosure includes a display part displaying a time; a metal case having a through-hole in a side surface; a metal crown disposed to enable opening and closing of the through-hole; and a wireless communication device housed inside the case. Moreover, the crown includes a head located outside the case and coming into contact with the case to close the through-hole, and a shank extending to the inside of the case through the through-hole with one end portion connected to the head and the other end portion located inside the case. When the head of the crown is pulled in a direction away from the case, the head of the crown becomes contactless with the case to enable a reader device located outside the case to read information of the wireless communication device through the crown.

With this configuration, the reader device can read the information of the wireless communication device when the head of the crown is pulled in a direction away from the case, so that it is not necessary to dispose a slit in the case as in Patent Document 1. Therefore, a reduction in the strength of the case can be prevented, and the restriction on appearance design can be eliminated. While the head of the crown is in contact with the case, the through-hole of the case is closed and the wireless communication device is surrounded by the metal case and the metal crown, so that the radio waves transmitted from the wireless communication device are not radiated to the outside. Therefore, the leakage of the information of the wireless communication device can be prevented.

Preferably, when the crown is pulled in the direction away from the case, a clearance communicating with the outside of the case is generated around the shank of the crown located in the through-hole. With this configuration, the crown is electrically independent of the case and the magnetic flux can come out through the clearance, so that the crown can be allowed to function as a booster or a repeater so as to achieve more favorable communication between the wireless communication device and the reader device.

Preferably, the wireless communication device is coupled via an electromagnetic field to the shank. With this configuration, the wireless communication device does not need to be in direct contact with the shank of the crown, so that the wireless communication device can be prevented from wearing due to axial rotation of the shank of the crown.

Preferably, the wireless communication device includes an RFIC element and a loop electrode connected to the RFIC element, and the loop electrode is disposed to have a loop plane intersecting with a principal surface of the case facing the display part. With this configuration, an electric field induced from a magnetic field due to the loop electrode can be prevented from being blocked by a metal surface, i.e., the principal surface of the case, so that the gain of the antenna can more reliably be acquired.

A method of determining authenticity of a watch with a built-in tag is provided with the watch having a built-in tag comprising a display part displaying a time, a metal case having a through-hole in a side surface; a metal crown disposed to enable opening and closing of the through-hole, and a wireless communication device housed inside the case. Moreover, the method includes pulling, in a direction away from the case, a head of the crown that is located outside the case and that comes into contact with the case to close the through-hole; and reading information of the wireless communication device by the reader device while the head of the crown is made contactless with the case.

With this method, the information of the wireless communication device is read by the reader device while the head of the crown is made contactless with the case by pulling the head of the crown is pulled in a direction away from the case, so that it is not necessary to dispose a slit in the case as in Patent Document 1 identified above. Therefore, a reduction in the strength of the case can be prevented, and the restriction on appearance design can be eliminated. While the head of the crown is in contact with the case, the through-hole of the case is closed and the wireless communication device is surrounded by the metal case and the metal crown, so that the radio waves transmitted from the wireless communication device are not radiated to the outside. Therefore, the leakage of the information of the wireless communication device can be prevented.

Preferably, the information of the wireless communication device is read by the reader device while a finger is brought into contact with the head of the crown. With this method, bringing a finger into contact with the head of the crown allows the finger to function as a booster so as to achieve more favorable communication between the wireless communication device and the reader device.

A watch with a built-in tag and a method of determining authenticity of a watch with a built-in tag according to an embodiment will now be described with reference to the accompanying drawings. In the drawings, substantially the same members are denoted by the same reference numerals.

EXEMPLARY EMBODIMENT

Figure 1:
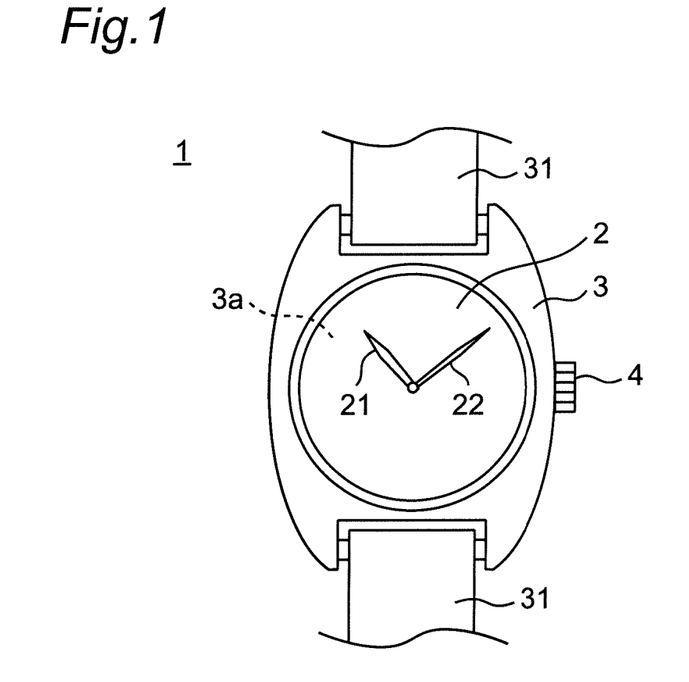
FIG. 1 is a plan view showing a schematic configuration of a watch with a built-in tag according to an exemplary embodiment of the present disclosure.
Figure 2:
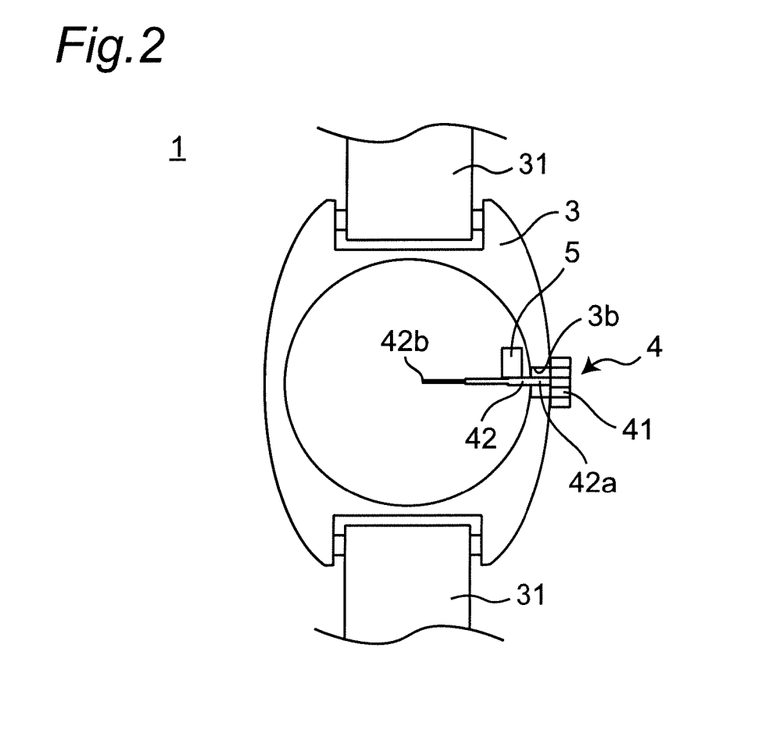
FIG. 2 is a plan view showing an internal structure of the watch with a built-in tag of FIG. 1.

FIG. 1 is a plan view showing a schematic configuration of a watch with a built-in tag 1 according to an embodiment of the present disclosure. FIG. 2 is a plan view showing an internal structure of the watch with a built-in tag 1 of FIG. 1. In this embodiment, the watch with a built-in tag 1 is a wristwatch.

As shown in FIG. 1 and FIG. 2, the watch with a built-in tag 1 includes a display part 2, a metal case 3, a metal crown 4, and an RFID tag 5 that is an example of a wireless communication device housed inside the case 3.

As shown in FIG. 1, the display part 2 displays a time. The display part 2 includes a short hand 21 and a long hand 22. In this embodiment, the display part 2 is attached to an outer surface of a principal surface 3a of the case 3. The display part 2 is covered with a glass cover, for example. The display part 2 may be disposed inside the case 3 as long as the display part 2 is visible from the outside.

Moreover, a band 31 for winding around the arm is attached to the case 3. The case 3 is configured to have a hollow structure. A drive mechanism (not shown) for rotationally driving the short hand 21 and the long hand 22 is disposed inside the case 3 as would be appreciated to one skilled in the art. Moreover, a through-hole 3b is disposed in a side surface of the case 3 as shown in FIG. 2.

A crown 4 is disposed such that the through-hole 3b can be opened and closed. More specifically, the crown 4 includes a head 41 and a shank 42. The head 41 is located outside the case 3 and is configured to contact the case 3 and thereby close the through-hole 3b. The diameter of the head 41 is larger than the diameter of the through-hole 3b. The shank 42 is configured such that one end portion 42a is connected to the head 41 while the other end portion 42b is extended to the inside of the case 3 through the through-hole 3b and located inside the case 3. The diameter of the shank 42 is smaller than the diameter of the through-hole 3b.

As shown in FIG. 2, the RFID tag 5 is coupled to the shank 42. In this embodiment, the RFID tag 5 is disposed near the shank 42 in a non-contact manner with respect to the shank 42, such that the RFID tag is coupled via an electromagnetic field to the shank 42.

Figure 3:
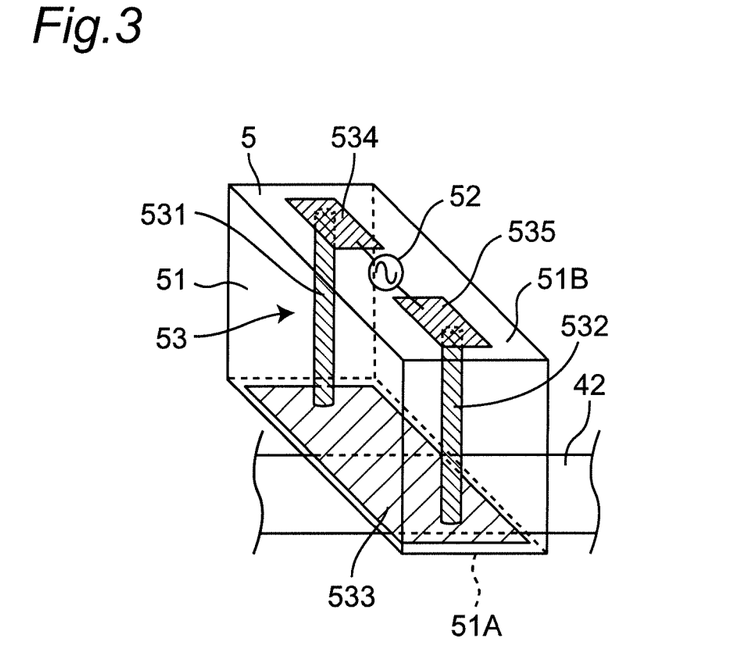
FIG. 3 is a perspective view showing a schematic configuration of an RFID tag.
Figure 4:
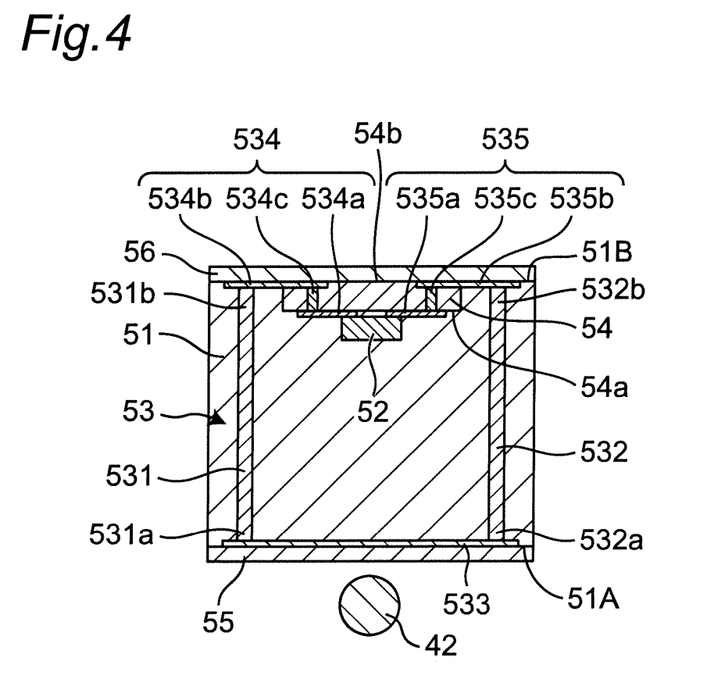
FIG. 4 is a cross-sectional view showing the schematic configuration of the RFID tag.

FIG. 3 is a perspective view showing a schematic configuration of the RFID tag 5. FIG. 4 is a cross-sectional view showing a schematic configuration of the RFID tag 5. FIGS. 3 and 4 also show a positional relationship between the RFID tag 5 and the shank 42 of the crown 4.

As shown in FIGS. 3 and 4, the RFID tag 5 includes a resin block 51, an RFIC element 52 serving as a power feeding part, and a loop electrode 53 serving as an antenna element. In FIG. 3, the resin block 51 is transparently shown. In FIG. 3, hatching is applied only to components forming the loop electrode 53.

The resin block 51 has a first surface 51A serving as a coupling surface for the shank 42 and a second surface 51B opposite to the first surface. According to an exemplary aspect, the resin block 51 is made of a hard resin material such as epoxy resin, for example. The resin block 51 is formed into a rectangular parallelepiped shape, for example.

As shown in FIG. 4, the RFIC element 52 is mounted on a first principal surface 54a of a substrate 54 and is disposed to be buried (i.e., embedded therein) in the second surface 51B of the resin block 51. The RFIC element 52 can be a RFIC element corresponding to a communication frequency in the 900 MHz band, i.e., the UHF band, for example. The RFIC element 52 is connected to the loop electrode 53.

The substrate 54 is provided on the second surface 51B side of the resin block 51. In this embodiment, the substrate 54 is disposed to be embedded in the second surface 51B of the resin block 51. The substrate 54 is made of a hard resin material such as epoxy resin, for example. The substrate 54 is formed into a rectangular shape, for example.

The loop electrode 53 includes a first metal pin 531, a second metal pin 532, a flat plate electrode 533, a first conductor pattern 534, and a second conductor pattern 535. The loop electrode 53 is disposed to have a loop plane intersecting (e.g., orthogonally or substantially perpendicularly) with the principal surface 3a (see FIG. 1) of the case 3. The loop plane is a plane passing through each of the first metal pin 531, the second metal pin 532, the flat plate electrode 533, the first conductor pattern 534, and the second conductor pattern 535.

For example, the first metal pin 531 and the second metal pin 532 are formed by processing a metal block (bulk) into a pin shape. The first metal pin 531 and the second metal pin 532 are embedded in the resin block 51. More specifically, the first metal pin 531 and the second metal pin 532 are embedded in the resin block 51 such that the pins extend in a direction intersecting with (e.g., orthogonal or substantially orthogonal to) the first surface 51A and the second surface 51B of the resin block 51. The first metal pins 531 and the second metal pins 532 are disposed at positions facing each other across the substrate 54 (i.e., in a horizontal or widthwise direction as shown in FIG. 4, for example).

The flat plate electrode 533 is disposed on the first surface 51A side of the resin block 51 and connects one end 531a of the first metal pin 531 and one end 532a of the second metal pin 532. The flat plate electrode 533 is formed into a rectangular shape, for example. In this embodiment, the width of the flat plate electrode 533 is formed larger than the diameters of the first metal pin 531 and the second metal pin 532. In planar view from the first surface 51A side of the resin block 51, the RFIC element 52 is disposed inside a projection plane of the flat plate electrode 533.

As shown in FIG. 4, a first wiring pattern 534a and a second wiring pattern 535a connected to the RFIC element 52 are formed on the first principal surface 54a of the substrate 54. In the substrate 54, a first via-hole conductor 534c and a second via-hole conductor 535c are disposed to penetrate in a thickness direction (i.e., orthogonal to the widthwise direction). The first wiring pattern 534a is connected to a first input/output terminal (not shown) of the RFIC element 52 and is connected to the first via-hole conductor 534c. The second wiring pattern 535a is connected to a second input/output terminal (not shown) of the RFIC element 52 and is connected to the second via-hole conductor 535c.

As shown in FIG. 4, a third wiring pattern 534b and a fourth wiring pattern 535b are formed over both the second surface 51B of the resin block 51 and the second principal surface 54b of the substrate 54. The third wiring pattern 534b is formed to connect the other end 531b of the first metal pin 531 and the first via-hole conductor 534c. The fourth wiring pattern 535b is formed to connect the other end 532b of the second metal pin 532 and the second via-hole conductor 535c.

In this embodiment, the first conductor pattern 534 is formed by the first wiring pattern 534a, the third wiring pattern 534b, and the first via-hole conductor 534c and connects the RFIC element 52 and the other end 531b of the first metal pin 531. The second conductor pattern 535 is formed by the second wiring pattern 535a, the fourth wiring pattern 535b, and the second via-hole conductor 535c and connects the RFIC element 52 and the other end 532b of the second metal pin 532.

On the first surface 51A of the resin block 51, a protective layer 55 is disposed to cover the flat plate electrode 533. On the second surface 51B of the resin block 51, a protective layer 56 is disposed to cover the first conductor pattern 534, the second conductor pattern 535, and the second principal surface 54b of the substrate 54.

Although not shown, two chip capacitors connected to the first wiring pattern 534a and the second wiring pattern 535a are mounted on the first principal surface 54a of the substrate 54. The two chip capacitors are arranged parallel to the RFIC element 52, and the RFIC element 52 is impedance-matched by the loop electrode 53 and the two chip capacitors. An LC resonance circuit is formed by the loop electrode 53 and the two chip capacitors.

A method of determining authenticity of the watch with a built-in tag 1 will be described with reference to FIGS. 5 and 6.

Figure 5:
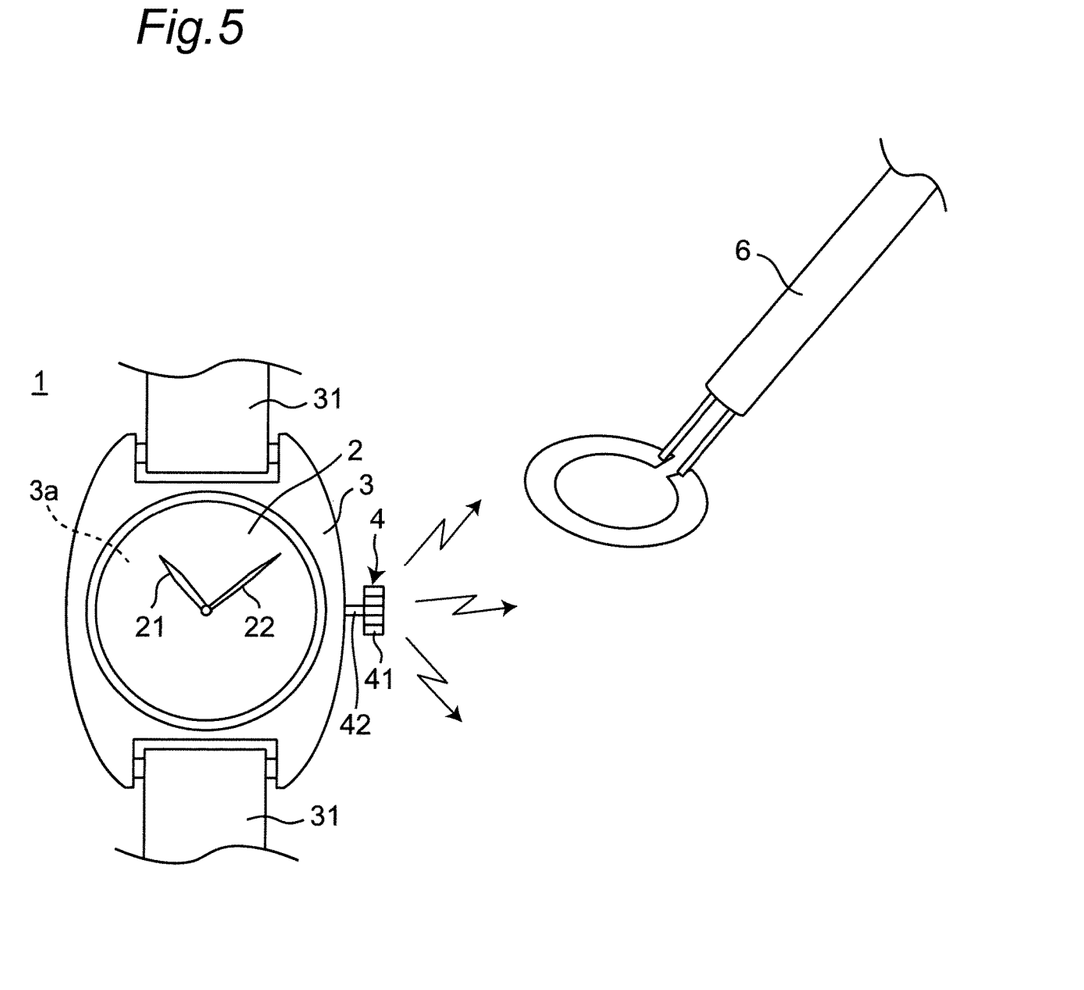
FIG. 5 is a plan view showing the schematic configuration of the watch with a built-in tag of FIG. 1 with a head of a crown pulled in a direction away from a case.
Figure 6:
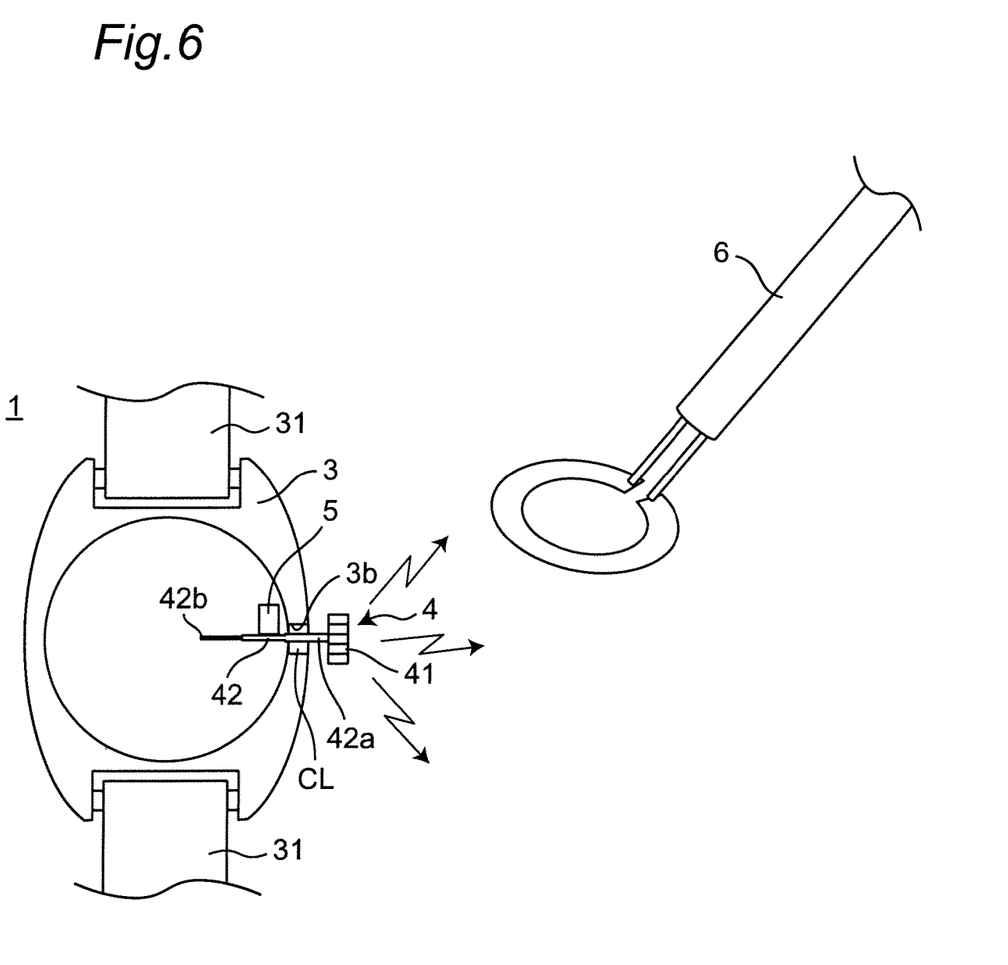
FIG. 6 is a plan view showing the internal structure of the watch with a built-in tag of FIG. 1 with the head of the crown pulled in the direction away from the case.

FIG. 5 is a plan view showing a schematic configuration of the watch with a built-in tag 1 with the head 41 of the crown 4 pulled in a direction away from the case 3 (i.e., in an opened state). FIG. 6 is a plan view showing the internal structure of the watch with a built-in tag 1 with the head 41 of the crown 4 pulled in the direction away from the case 3 (also in the opened state).

First, as shown in FIG. 5, the head 41 of the crown 4 is pulled in the direction away from the case 3. As a result, as shown in FIG. 6, a clearance CL communicating with the outside of the case 3 is generated around the shank 42 of the crown 4 located in the through-hole 3b, and the head 41 and the shank 42 of the crown 4 become contactless with the case 3. In an exemplary aspect, the diameter of the through-hole 3b is about 2.0 mm, for example. The diameter of the shank 42 is about 1.0 mm, for example. The clearance CL is about 0.5 mm, for example.

Subsequently, while the head 41 and the shank 42 of the crown 4 are contactless (i.e., not in direct contact) with the case 3, the information of the RFID tag 5 can be read by a reader device 6. In this case, the crown 4 is electrically independent of the case 3, and a signal current flows in the extending direction of the crown 4 while a magnetic flux can come out through the clearance CL, so that the crown 4 is configured to an functions as a booster or a repeater. The reader device 6 reads the information of the RFID tag 5 through the crown 4. Based on the information (e.g., unique ID) of the RFID tag 5, the authenticity of the watch with a built-in tag 1 can be determined. The reader device 6 is a handheld type reader device, and an antenna made up of a single-turn loop is attached to a tip portion thereof.

According to this embodiment, the reader device 6 can read the information of the RFID tag 5 when the head 41 of the crown 4 is pulled in a direction away from the case 3, so that it is not necessary to dispose a slit in the case 3. Therefore, a reduction in the strength of the case 3 can be prevented, and the restriction on appearance design can be eliminated. While the head 41 of the crown 4 is in contact with the case 3, the through-hole 3b of the case 3 is closed and the RFID tag 5 is surrounded by the metal case 3 and the metal crown 4, so that the radio waves transmitted from the RFID tag 5 are not radiated to the outside. Therefore, the leakage of the information of the RFID tag 5 can be prevented.

According to this embodiment, when the crown 4 is pulled in a direction away from the case 3, the clearance CL communicating with the outside of the case 3 is generated around the shank 42 of the crown 4 located in the through-hole 3b. With this configuration, the crown 4 is electrically independent of the case 3 and the magnetic flux can come out through the clearance CL, so that the crown 4 can be allowed to function as a booster or a repeater so as to achieve more favorable communication between the RFID tag 5 and the reader device 6.

According to this embodiment, the RFID tag 5 is disposed such that the RFID tag is coupled via an electromagnetic field to the shank 42. With this configuration, the RFID tag 5 does not need to be in direct contact with the shank 42 of the crown 4, so that the RFID tag 5 and the crown 4 can be prevented from wearing due to axial rotation of the shank 42 of the crown 4 and push/pull of the crown in the extending direction, without disposing a complex mechanism. It is noted that for purposes of this disclosure, the phrase "coupling via an electromagnetic field" means coupling via an electric field, a magnetic field, or both, as would be appreciated to one skilled in the art.

According to this embodiment, the RFID tag 5 includes the RFIC element 52 and the loop electrode 53 connected to the RFIC element 52, and the loop electrode 53 is disposed to have a loop plane intersecting with the principal surface 3a of the case 3 facing the display part 2. With this configuration, an electric field induced from a magnetic field due to the loop electrode 53 can be prevented from being blocked by a metal surface, i.e., the principal surface 3a of the case 3, so that the gain of the antenna can more reliably be acquired.

It should be appreciate that the present disclosure is not limited to the exemplary embodiment described above and can be implemented in various other forms. For example, in the above description, the watch with a built-in tag 1 is a wristwatch; however, the present disclosure is not limited thereto. For example, the watch with a built-in tag 1 may be a pocket watch. The present disclosure is not limited to a device having only a watch function and may be applied to a so-called wearable terminal further having a wireless communication function and a biometric information sensing function, for example.

In the above description, when the crown 4 is pulled in the direction away from the case 3, the clearance CL communicating with the outside of the case 3 is generated around the shank 42 of the crown 4 located in the through-hole 3b; however, the clearance CL is not limited to a space. The clearance CL may be filled with a material that does not blocking a flow of a magnetic flux. For example, the clearance CL may be filled with an elastic member such as rubber for waterproofing. The clearance CL is not limited to being disposed entirely around the shank 42. In other words, the shank 42 and the case 3 may partially be in contact with each other.

Figure 7:
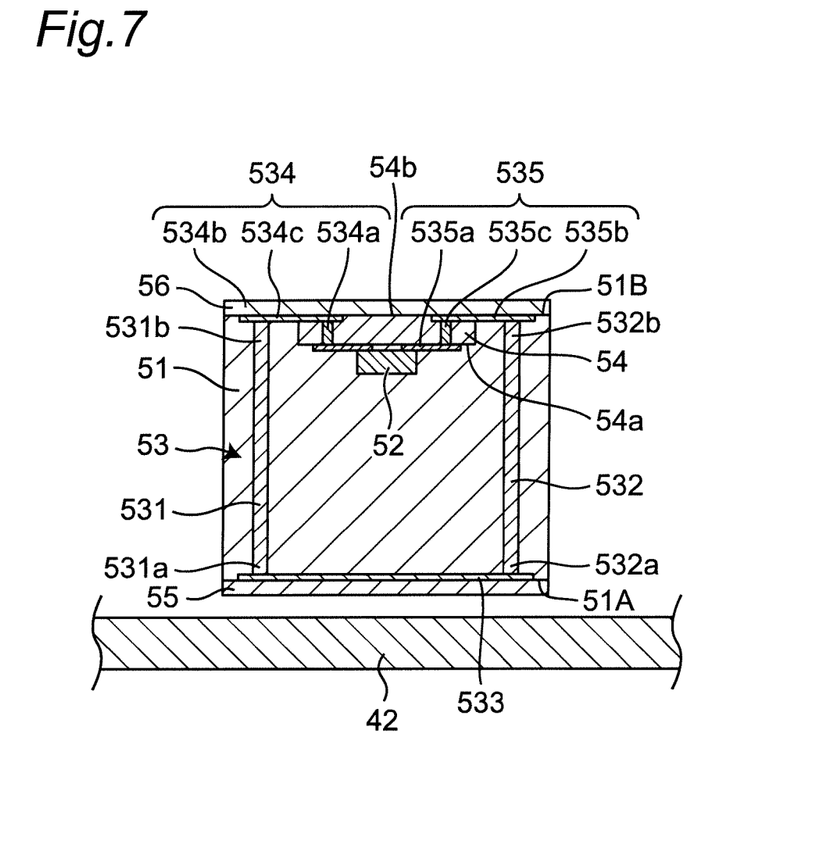
FIG. 7 is a cross-sectional view showing a modification of a positional relationship between the RFID tag and a shank of the crown.

In the above description, as shown in FIG. 4, the RFID tag 5 is disposed such that the extending direction of the shank 42 is parallel to the winding axis of the loop electrode 53; however, the present disclosure is not limited thereto. For example, as shown in FIG. 7, the RFID tag 5 may be disposed such that the extending direction of the shank 42 is orthogonal to the winding axis of the loop electrode 53. This configuration enables the magnetic field having a central axis coincident with the shank 42 to pass through the inside of the loop electrode 53.

In the above description, the reader device 6 has the reader function of reading the information of the RFID tag 5; however, the present disclosure is not limited thereto. For example, the reader device 6 may be configured to have a reader/writer function of reading the information of the RFID tag 5 and writing information to the RFID tag 5. For example, the present disclosure can be used for production management, distribution management, repair history management, etc. in addition to authenticity determination.

In the above description, as shown in FIGS. 3 and 4, the RFID tag 5 is formed by and includes the resin block 51, the RFIC element 52, and the loop electrode 53; however, the present disclosure is not limited thereto. The RFID tag 5 may be housed inside the case 3 and configured to be communicable with the reader device 6 when the head 41 of the crown 4 is pulled in the direction away from the case 3.

Figure 8:
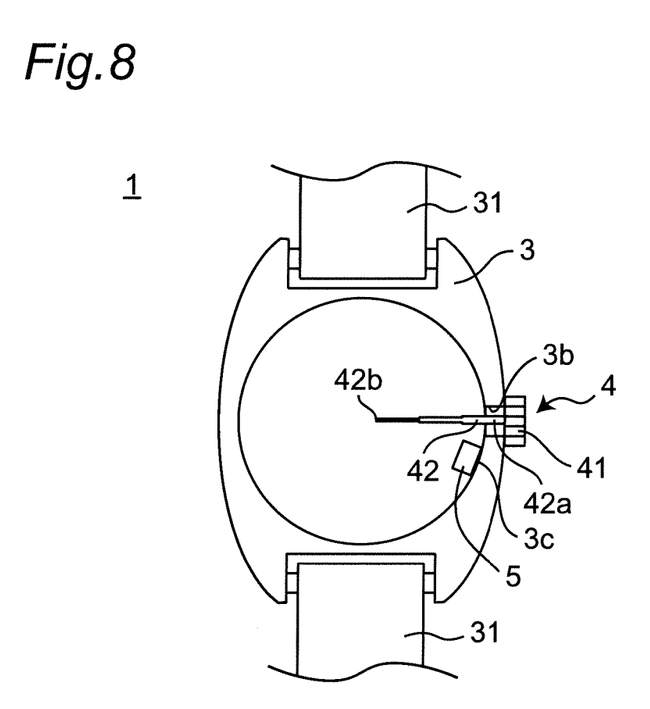
FIG. 8 is a plan view showing an internal structure of a watch with a built-in tag according to a modification in which an RFID tag is disposed on an inside surface of a case.
Figure 9:
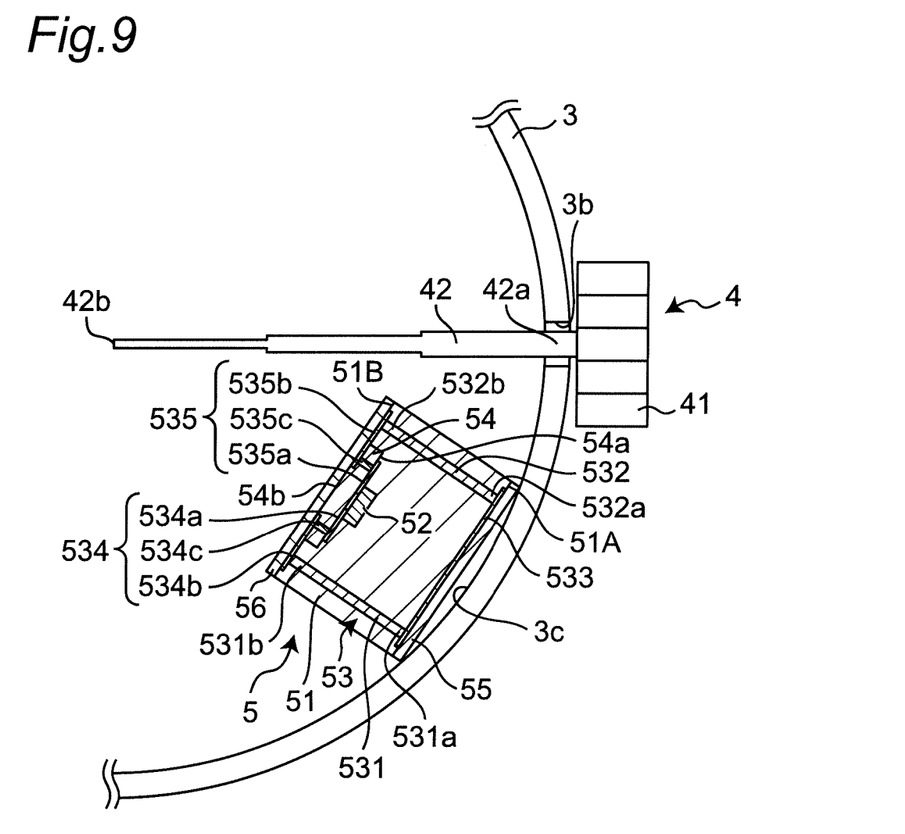
FIG. 9 is a partially enlarged plan view of FIG. 8.

In the above description, as shown in FIG. 2, the RFID tag 5 is disposed at the shank 42; however, the present disclosure is not limited thereto. For example, as shown in FIG. 8, the RFID tag 5 may be disposed on an inside surface 3c of the case 3. In this case, as shown in FIG. 9, the RFID tag 5 may be disposed such that the flat plate electrode 533 faces the inside surface 3c of the case 3 via the protective layer 55. Even with such a configuration, the RFID tag 5 can communicate with the reader device 6 when the head 41 of the crown 4 is pulled in the direction away from the case 3.

Figure 10:
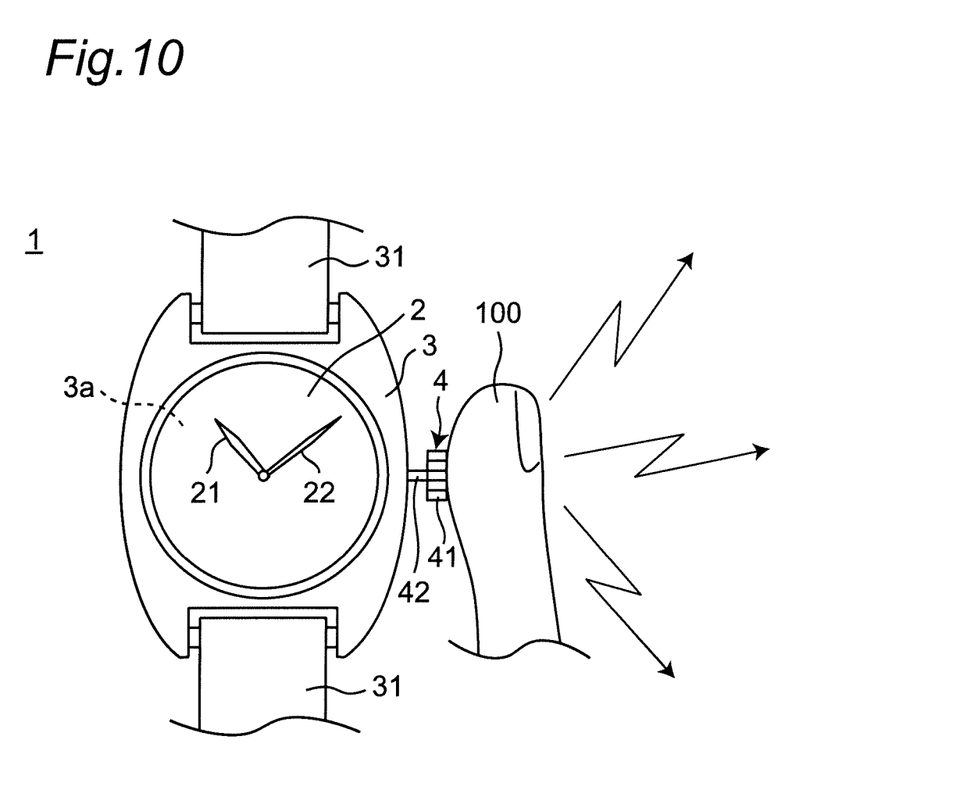
FIG. 10 is a plan view showing a state in which a finger is brought into contact with the head of the crown pulled in the direction away from the case.

In the above description, the reader device 6 is brought closer to the head 41 of the crown 4 pulled in the direction away from the case 3 to read the information of the RFID tag 5 by the reader device 6; however, the present disclosure is not limited thereto. For example, as shown in FIG. 10, the information of the RFID tag 5 can be read by the reader device 6 while a portion of a human body such as a finger 100 is brought into contact with the head 41 of the crown 4. With this method, bringing the finger 100 into contact with the head 41 of the crown 4 allows the finger 100 to function as a booster so as to achieve more favorable communication between the RFID tag 5 and the reader device 6.

Although the present disclosure has been described in some detail in terms of the embodiments, these contents of disclosure of the embodiments may obviously be changed in detail of configurations. Changes in combinations and orders of elements in the embodiments may be achieved without departing from the scope and the idea of the present disclosure.

The watch with a built-in tag of the present disclosure can suppress a reduction in strength of a case, restriction on appearance design, and leakage of information of a wireless communication device and is therefore particularly useful for authenticity determination of expensive watches.

EXPLANATIONS OF LETTERS OR NUMERALS

1 watch with a built-in tag
2 display part 3 case
3a principal surface
3b through-hole
3c inside surface
4 crown
5 RFID tag
6 reader device
21 short hand
22 long hand
31 band
41 head
42 shank
42a one end portion
42b the other end portion
51 resin block
51a first surface
51b second surface
52 RFIC element
53 loop electrode
54 substrate
54a first principal surface
54b second principal surface
55, 56 protective layer
100 finger
531 first metal pin
531a one end portion
531b the other end portion
532 second metal pin
532a one end portion
532b the other end portion
533 flat plate electrode
534 first conductor pattern
534a first wiring pattern
534b third wiring pattern
534c first via-hole conductor
535 second conductor pattern
535a second wiring pattern
535b fourth wiring pattern
535c second via-hole conductor
CL clearance

The invention claimed is:

1. A watch with a built-in tag for wirelessly communicating data, the watch comprising:
a display configured to display a time;
a metal case having a through-hole in a side surface;
a metal crown disposed in the through-hole and configured to open and close the through-hole; and
a wireless communication device housed inside the case,
wherein the metal crown includes:
a head disposed outside the metal case and that contacts the metal case to close the through-hole, and
a shank extending from the head to the inside of the metal case through the through-hole with a first end connected to the head and a second end disposed inside the case, and
wherein, when the head of the metal crown is pulled away from the metal case to open the through-hole, the head of the metal crown becomes contactless with the metal case and enables the wireless communication device housed inside the metal case to wirelessly transmit information to a reader device through the metal crown.

2. The watch according to claim 1, wherein, when the metal crown is pulled away from the case, a clearance communicating outside the case is generated around the shank disposed in the through-hole.

3. The watch according to claim 1, wherein the wireless communication device is configured to electromagnetically field couple to the shank.

4. The watch according to claim 1, wherein the wireless communication device includes an RFIC element and a loop electrode connected to the RFIC element and configured to have a loop plane that intersects a principal surface of the metal case facing the display.

5. The watch according to claim 4, wherein the wireless communication device comprises a resin block with the RFIC element embedded therein.

6. The watch according to claim 5, wherein the wireless communication device comprises a loop antenna including the loop electrode that is coupled to the RFIC element.

7. The watch according to claim 6, wherein the loop antenna comprises a flat plate electrode disposed on a side of the resin block opposite the RFIC element.

8. The watch according to claim 7, wherein the loop antenna comprises first and second conductor patterns coupled to respective terminals of the RFIC element and first and second metal pins connecting the flat plate electrode to the first and second conductor patterns, respectively.

9. The watch according to claim 8, further comprising a substrate with the RFIC element disposed on a first pair of wiring patterns on a first surface of the substrate and a second pair of wiring patterns disposed on a second surface of the substrate and coupled to the first pair of wiring patterns by a pair of vias extending through the substrate, respectively.

10. The watch according to claim 9, wherein the first pair of wiring patterns extend along a surface of the resin block and are coupled to the first and second metal pins, respectively.

11. The watch according to claim 7, wherein the wireless communication device is disposed in the metal case such that the flat plate electrode faces an inside surface of the case via a protective layer covering the flat plate electrode.

12. The watch according to claim 4, wherein the shank extends in a direction orthogonal to a winding axis of the loop electrode, such that a magnetic field having a central axis coincident with the shank passes through an inside of the loop electrode.

13. A watch with a built-in tag for authenticating the watch, the watch comprising:
a metal case having a hole extending through a side surface of the metal case;
an RFID tag disposed the case; and
a metal crown configured to enable wireless data communication between the RFID tag and a reader device outside the watch, wherein the metal crown includes:
a head that contacts the metal case to close the hole when the metal crown is in a closed position, and
a shank extending through the hole and having a first end connected to the head and a second end disposed inside the metal case opposite the first end,
wherein the head becomes contactless from the metal case when the head of the metal crown is pulled away from the metal case in an opened position configuring the RFID tag to wirelessly transmit data to the reader device.

14. The watch according to claim 13, wherein, when the metal crown is pulled away from the metal case, a clearance communicating outside the metal case is generated around the shank disposed in the hole in the side surface of the metal case.

15. The watch according to claim 13, wherein the RFID tag is coupled by electromagnetic field coupling to the shank.

16. The watch according to claim 13, wherein the RFID tag includes an RFIC element and a loop electrode connected to the RFIC element and has a loop plane that intersects a principal surface of the metal case facing a display of the watch.

17. The watch according to claim 16, wherein the shank extends in a direction orthogonal to a winding axis of the loop electrode, such that a magnetic field having a central axis coincident with the shank passes through an inside of the loop electrode.

18. The watch according to claim 13, wherein the RFID tag includes a resin block with the RFIC element embedded therein and a loop antenna coupled to the RFIC element.

19. A method of determining authenticity of a watch with a built-in tag and including a display configured to display a time, a metal case having a through-hole in a side surface, a metal crown disposed in the through-hole and configured to open and close the through-hole, and a wireless communication device housed inside the case, the method comprising:

pulling, in a direction away from the metal case, a head of the metal crown that is located outside the metal case and that comes into contact with the metal case to close the through-hole; and reading, by a reader device, information of the wireless communication device when the head of the metal crown is pulled away from the metal case to be made contactless with the metal case.

20. The method of determining authenticity of the watch according to claim 19, further comprising reading, by the reader device, the information of the wireless communication device when a finger is brought into contact with the head of the metal crown.

* * * * *